United States Patent [19]
Wied et al.

[11] Patent Number: 5,828,893
[45] Date of Patent: Oct. 27, 1998

[54] SYSTEM AND METHOD OF COMMUNICATING BETWEEN TRUSTED AND UNTRUSTED COMPUTER SYSTEMS

[75] Inventors: William J. Wied, Mesa; Kanchei Loa, Chandler, both of Ariz.

[73] Assignee: Motorola, Inc., Schaumburg, Ill.

[21] Appl. No.: 517,563

[22] Filed: Aug. 21, 1995

Related U.S. Application Data

[63] Continuation of Ser. No. 996,465, Dec. 24, 1992, abandoned.

[51] Int. Cl.$^6$ ........................................... G06F 15/00
[52] U.S. Cl. ............... 395/800; 395/800; 395/200.01; 395/200.06; 395/200.15; 395/188.01; 395/186; 380/23; 380/24; 380/25; 380/30; 380/49; 340/825.34
[58] Field of Search ..................... 395/800, 200.01, 395/200.06, 188.01, 186, 200.15; 380/30, 23, 24, 25, 49; 340/825.34

[56] References Cited

U.S. PATENT DOCUMENTS

| | | | |
|---|---|---|---|
| 4,584,639 | 4/1986 | Hardy | 395/650 |
| 4,916,704 | 4/1990 | Bruckert et al. | 395/182.09 |
| 4,924,513 | 5/1990 | Herbison et al. | 380/21 |
| 4,977,582 | 12/1990 | Nichols et al. | 375/371 |
| 5,200,993 | 4/1993 | Wheeler et al. | 379/96 |
| 5,251,205 | 10/1993 | Callon et al. | 370/60 |
| 5,260,999 | 11/1993 | Wyman | 380/4 |
| 5,280,529 | 1/1994 | Nøst | 380/49 |
| 5,313,465 | 5/1994 | Perlman et al. | 370/85.13 |
| 5,313,579 | 5/1994 | Chao | 395/200.15 |
| 5,329,619 | 7/1994 | Pagé et al. | 395/200.01 |
| 5,490,252 | 2/1996 | Macera et al. | 395/200.01 |

OTHER PUBLICATIONS

"Eagle Network Isolator", User's Guide published by Raptor Systems, Inc., Wilmington, Delaware in 1992.
Casey et al., "A Secure Distributed Operating System", IEEE, May 1988, pp. 27–38.
Wong, "Issues in Secure Distributed Operating System Design," IEEE, Apr. 1989, pp. 338–341.
Vinter, "Extended Discretionary Access Controls", IEEE, 1988, pp. 39–49.
Rossen, "Network Security: Just Say 'Know' at Layer 7," Data Communications, Mar. 1991, pp. 103–106.
Telstra, "Security Papers and Documents".
Bellovin, "Security Probrems in the TCP/IP Protocol Suite", Computer Communication Review, vol. 19, No. 2, pp. 32–48, Apr. 1989.
Bellovin et al., "Limitations of the Kerberos Authentication System", USENIX, Winter 1991, pp. 1–15.
Cheswick, "The Design of a Secure Internet Gateway", Apr. 20, 1990, pp. 1–5.
Bishop, "A Security Analysis of the NTP Protocol", Jun. 13, 1990, pp. 1–20.
"ICL Joins Hughes STX in US on Secure Networking", Computergram International, Jun. 16, 1992.

*Primary Examiner*—Alyssa H. Bowler
*Assistant Examiner*—John Follansbee
*Attorney, Agent, or Firm*—Robert D. Atkins

[57] ABSTRACT

A computer network comprising a trusted computer network (16), and an untrusted computer network (17). A plurality of firewall systems (21) provide controlled access between the trusted computer network and the first untrusted computer network. An Application layer bridge (22) establishes a transparent virtual circuit across the plurality of firewalls (21).

3 Claims, 4 Drawing Sheets

FIG. 2 -PRIOR ART-

SYSTEM AND METHOD OF COMMUNICATING BETWEEN TRUSTED AND UNTRUSTED COMPUTER SYSTEMS

This application is a continuation of prior application Ser. No. 07/996,465 filed Dec. 24, 1992, now abandoned.

BACKGROUND OF THE INVENTION

The present invention relates, in general, to providing controlled access between two computer networks, and more particularly to a network bridging system which tightly controls access between networks.

The Internet is a large, worldwide, research computer network which allows both public and private institutions to communicate and to share information. It was estimated that in October 1991 the Internet contained approximately 10,000 connected networks and 600,000 host systems. The Internet continues to grow rapidly. The sheer size has made the Internet useful as a tool for researchers to exchange resources, technology, and information. It is rich in publicly available information such as software, binary data, and documents. The Internet is also used to exchange ideas through publicly accessible computer bulletin boards and electronic mail. It not only provides access to domestic resources but also has links to other networks in foreign countries throughout the world. Because the Internet joins so many different networks, security is a significant concern and problem. There have been numerous occurrences of intrusions by individuals into public, private, and government networks through the Internet facility. More specifically, it has been the concern of private institutions to be able to connect to the Internet and other untrusted networks while still being able to protect their own network from unwanted intrusions.

There is a need for a network to network "bridge" which will allow a private "trusted" network to be connected to an "untrusted" network such as the Internet while still controlling access to the private "trusted" network. This bridge must allow only authorized connections between the two networks while at the same time minimizing the administrative overhead and user inconvenience required to operate the bridge. Ideally the bridge should operate without requiring overhead from the final user of the systems which make up the two networks. The bridge should allow multiple levels of access for different users allowing some users access to only one or two systems within the private network, yet allowing free access to any machine on either the trusted network or the untrusted network for other users. It is essential that special software not be required to access the bridge either within the trusted network or from the external untrusted network. The bridge should be flexible enough to allow the trusted network to connect to many untrusted networks.

SUMMARY OF THE INVENTION

The present invention provides a computer network comprising a trusted computer network, and an untrusted computer network. A plurality of firewall systems which provide controlled access between the trusted computer network and the untrusted computer network. An application layer bridge which establishes a transparent virtual circuit across the plurality of firewalls.

DETAILED DESCRIPTION OF THE DRAWINGS

Figure 1:
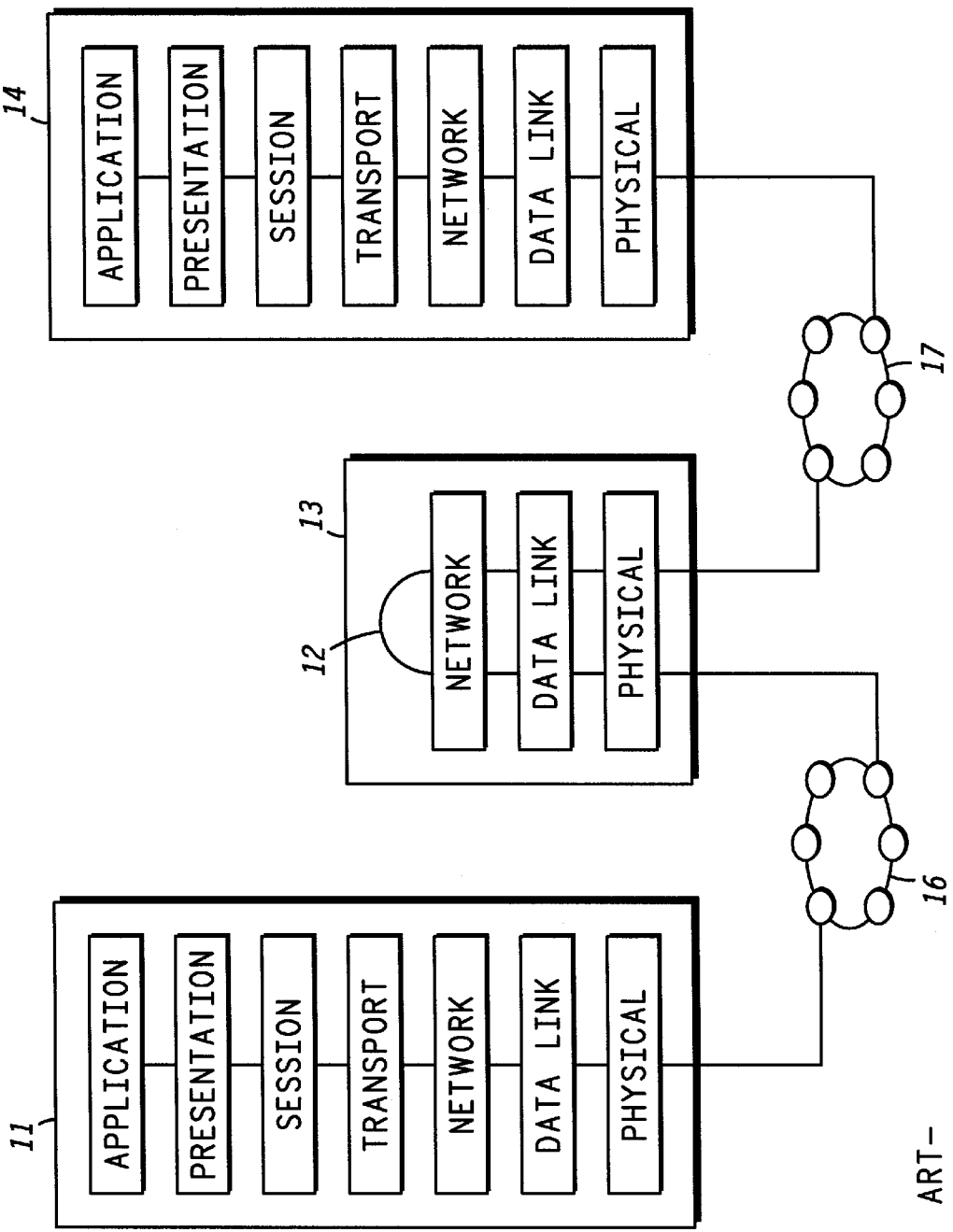
FIG. 1 shows a diagram of two computer systems connected to separate computer networks which are linked by a network bridge according to the prior art.

FIG. 1 shows a diagramatic view of a trusted network 16 linked to an untrusted network 17 by a network bridge 13 according to the prior art. A local computer system 11 is connected to trusted network 16. A remote computer system 14 is connected to untrusted network 17. For local computer system 11 to communicate with remote computer system 14 it is necessary for network bridge 13 to create a network routing link 12. For brevity and clarity, the structure and operation of local computer system 11, network bridge 13, and remote computer system 14 are described using ISO 7498-1988 (E), entitled "OSI Basic Reference Model" which is included herein by reference. It should be understood that this model is merely used to aid clarity and conciseness and that the present invention is not restricted to computer systems designed in accordance with the OSI Basic Reference Model.

A request for connection must originate at the application layer of local computer system 11. This may be as the result of a user request, an application program which needs to send or receive information, or a routine system service such as electronic mail. The request is processed through the layers of local computer system 11 and passed through trusted network 16 to network bridge 13. Network bridge 13 is constructed to handle all messages at the Network layer. The Network layer determines that a connection is required between trusted network 16 and untrusted network 17. Accordingly the Network layer creates network routing link 12. This enables information from local computer system 11 to be passed through trusted network 16, network routing link 12, and untrusted network 17 to remote computer system 14. The information is then passed through the various layers to the Application layer within remote computer system 14 which responds to requests from local computer system 11. For example if a user of local computer system 11 requests a file from remote computer system 14, that request is passed to the Application layer of remote computer system 14. Remote computer system 14 locates the file requested and sends a return message containing the file requested. This method has the advantage that a simple request entered in local computer system 11 can automatically obtain a file from remote computer system 14 even though remote computer system 14 is not directly connected to the same network as local computer system 11. Network bridges similar to network bridge 13 are commonly used to pass information from one network to another. The disadvantage is that since network bridge 13 is programmed to handle only Network level functions such as routing, sophisticated security measures are not possible. As a result trusted network 16 can be penetrated by an intruder merely by requesting a link from untrusted network 17.

Figure 2:
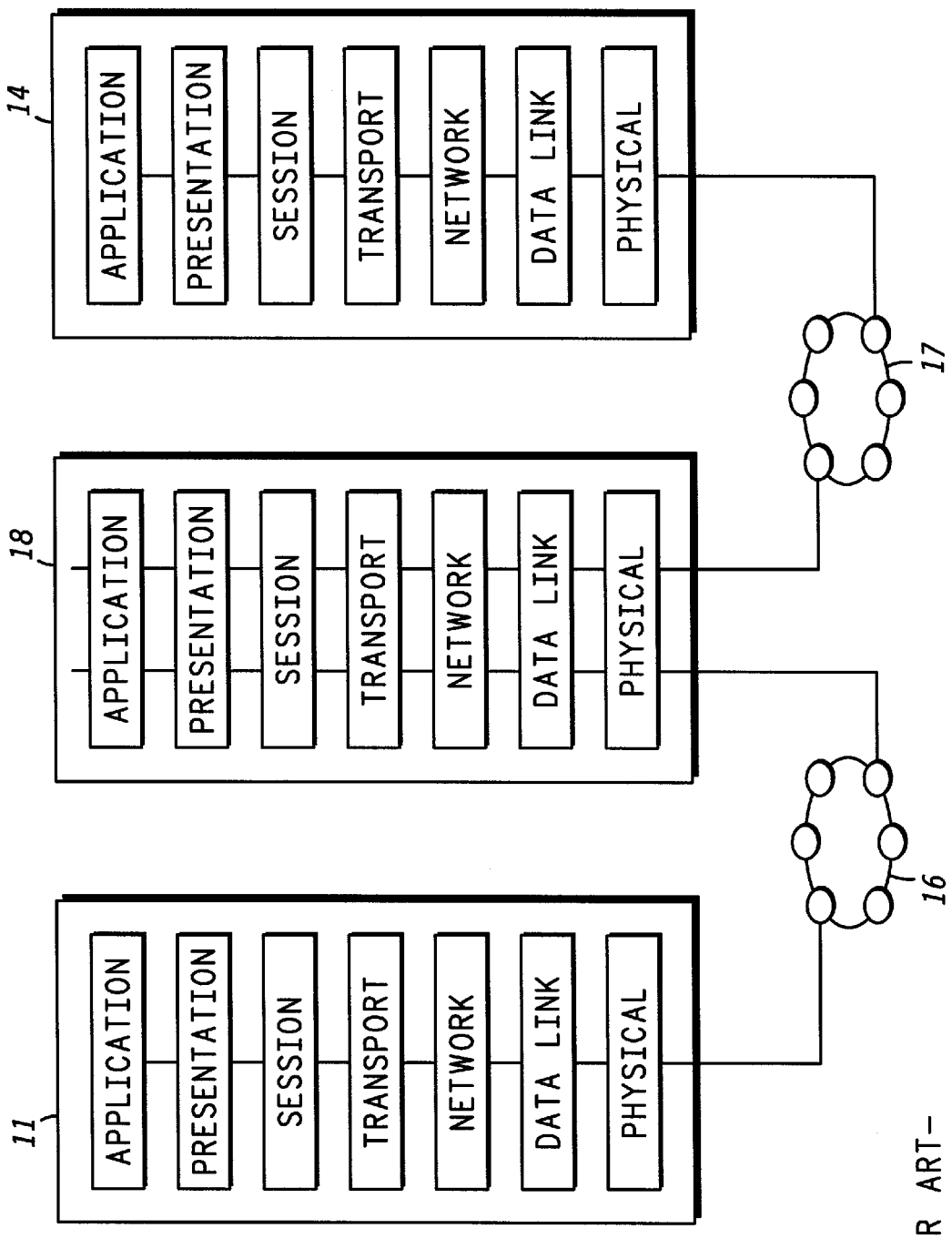
FIG. 2 shows a diagram of a local computer system connected to a trusted network linked by a firewall system to a remote computer system connected to an untrusted network according to the prior art.

FIG. 2 shows a diagramatic view of trusted network 16 linked to untrusted network 17 by a firewall system 18 according to the prior art. Firewall system 18 is similar to network bridge 13 except that the Transport, Session, Presentation, and Application layers are included in firewall system 18. This allows a user of local computer system 11 to directly access firewall system 18 through trusted network 16. Likewise remote computer system 14 can access firewall system 18 through untrusted network 17. Firewall system 18 can access both local computer system 11 and remote computer system 14 through the respective networks. In order to create a routing link similar to network routing link 12 (FIG. 1), local computer system 11 must first access firewall system 18 as a remote user. This mode of operation allows a user of local computer system 11 to act as if the user were a local user of firewall system 18. The user must then log-on to firewall system 18. Thus the security measures which are built into the log-on system are used to validate the user of local computer system 11. The user then performs another remote log-on to remote computer system 14. To transfer a file, a complete copy of the file must first be copied onto firewall system 18 and saved, then a second copy made for the destination system. This process is wasteful of resources as well as requiring extra effort by the user. Automated communication between local computer system 11 and remote computer system 14 requires custom Application layer software for both computer systems. Since a computer network typically has several thousand nodes, custom software for each node is impractical.

Firewall system 18 allows control of security by requiring that each user be validated during the log-on process, but adds significantly to the overhead associated with communication between local computer system 11 and remote computer system 14. This method also requires that every user have a separate account set up on firewall system 18, a heavy administrative load with a typical trusted network 16 having several thousand users. Firewall system 18 must have access to both local computer system 11 and to remote computer system 14. Firewall system 18 can thus become a "super node" which has access to every computer system which is connected to trusted network 16 as well as to every computer system which is connected to untrusted network 17. Accordingly, security of firewall system 18 must be very closely monitored and tightly controlled, adding further to the administrative burden. Trusted network 16 can only be considered a secure, trusted network if all means of access, including firewall system 18, are adequately controlled. Using firewall system 18, a satisfactory level of security can only be attained with a high cost in both administrative and user overhead. Even so creation of a "super node" provides a weak link in the security of trusted network 16.

Figure 3:
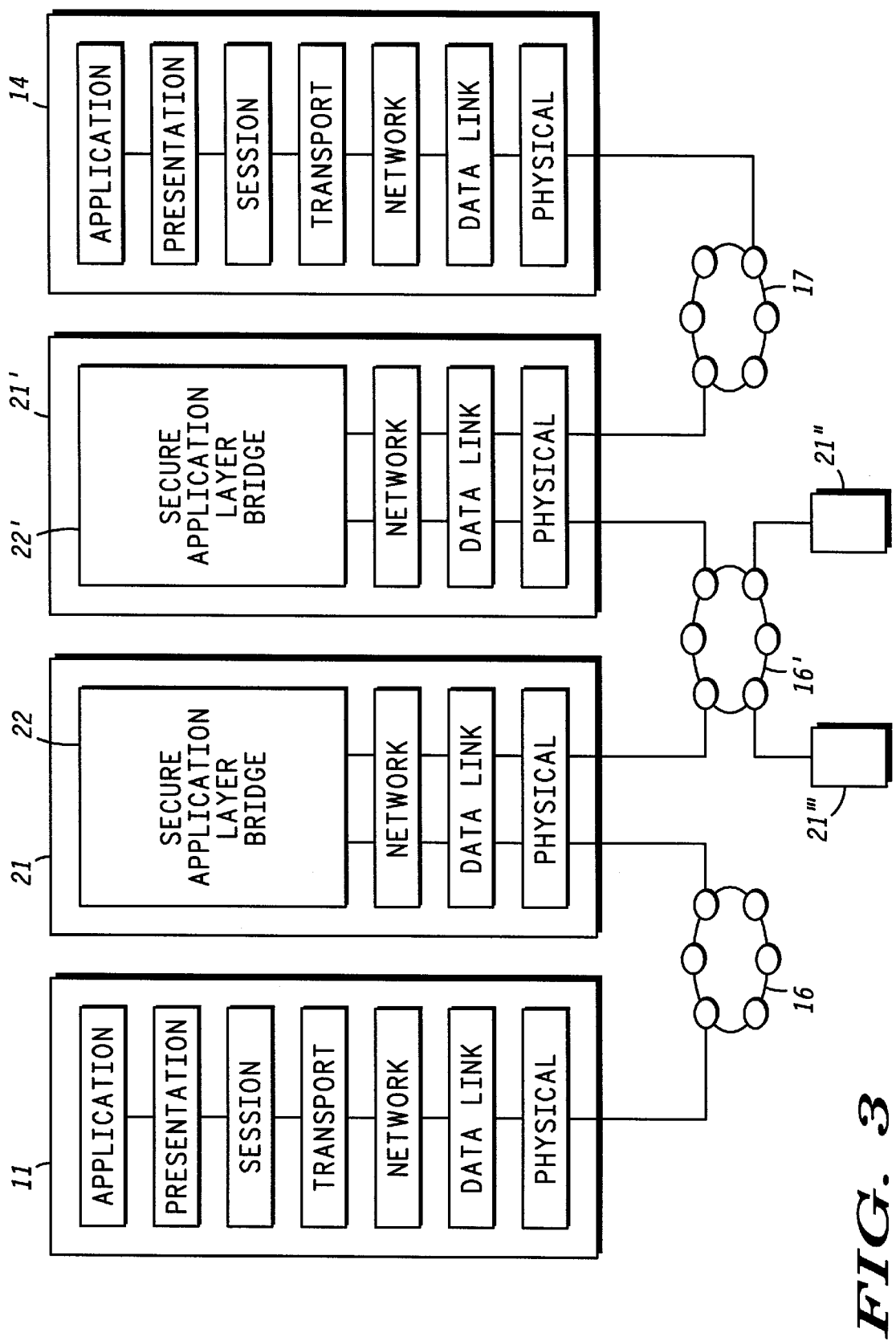
FIG. 3 shows a local computer system linked to a remote computer system by a secure application layer bridge as a preferred embodiment in accordance with the present invention.

FIG. 3 shows local computer system 11 linked to remote computer system 14 by an Application layer bridge 22 and an Application layer bridge 22' as a preferred embodiment in accordance with the present invention. Local computer system 11 communicates with a secure host 21 through trusted Network 16. Application layer bridge 22 is typically a computer program run on secure host 21. Application layer bridge 22 is the only path for communication between the networks which are connected by secure host 21. Accordingly, secure host 21 acts as a firewall system similar to firewall system 18 (FIG. 2). Application layer bridge 22, however, is configured to communicate only with another Application layer bridge 22' which runs on a secure host 21'. A plurality of secure hosts 21" and 21'" are alternatively used to communicate with other networks. In the example shown Application layer bridge 22 communicates with Application layer bridge 22' through an trusted network 16'. Trusted network 16' is typically a separate dedicated network, but could alternatively be some other means for communication between two computer systems.

To establish communication between local computer system 11 and remote computer system 14 a link is first established through trusted network 16 between local computer system 11 and secure host 21. The connection request is forwarded to Application layer bridge 22. Application layer bridge 22 validates the connection request assuring that both sender and receiver are authorized to make the connection requested. Once this request is validated, Application layer bridge 22 determines which Application layer bridge 22' is required for the requested connection. A connection is then made between Application layer bridge 22 and Application layer bridge 22'. Application layer bridge 22' then revalidates the connection request to ensure that the connection is authorized by the administrator of secure host 21'. Application layer bridge 22' then establishes a connection through untrusted Network 17 to remote computer system 14 thus a complete connection exists between local computer system 11 and remote computer system 14.

Once validation is completed, Application layer bridge 22 and Application layer bridge 22' act as a transparent virtual circuit, passing all information received from local computer system 11 to remote computer system 14 without modification. This allows applications which are run on either local computer system 11 or remote computer system 14 to communicate without modification as if they were linked by network bridge 13 (FIG.1). Common types of application are typical of such communication, for example programs using the well-known Telnet protocol defined in MIL-STD 1782 and the well-known file transfer protocol (FTP) protocol defined in MIL-STD 1780 which standards are incorporated herein by reference. The Telenet protocol allows interactive remote log-in to a computer system across a computer network. The FTP protocol allows interactive file transfer capabilities between computer systems across a computer network. Telnet allows remote log-on to a computer system as if the user were physically present at that computer system. FTP allows file transfer between two computer systems while guaranteeing file completeness and integrity. Other examples are applications such as distributed data-bases which internally use the well-known transmission control protocol/internet protocol (TCP/IP) protocol for communication between different parts of the program. TCP/IP are the defacto standard network protocols of the public internet. Achieving a transparent end-to-end connection as provided by Application layer bridge 22 is an essential element in applications made to use the well known network standards. This is accomplished by allowing the transparent virtual circuit to operate in strict accordance with the Telnet, FTP, or other TCP/IP protocols.

Secure host 21' and Application layer bridge 22' represent a plurality of such secure hosts and Application layer bridges which link a plurality of computer networks. Application layer bridge 22 must determine which of many secure Application layer bridges 22', 22" or 22'" are to be used to create the virtual connection and allow communication between local computer system 11 and remote computer system 14. In the preferred embodiment this is accomplished by means of a routing table stored in the standard file "/etc/routes". This file contains a list of "source" and "destination" entries which define the route for every pair of systems which are permitted to communicate. The entries may use a well-known IP address of the form "nnnn.nnnn.nnnn.nnnn" which uniquely identifies each network node. Symbolic names such as hierarchical names of the form "a.b.c.d" can be used, in this case a partial name such as "b.c.d" designates a group of network nodes known as a "domain". In addition, arbitrary symbolic names such as "!LOCAL", !XYZNET", "!EXTERNAL", or "!ORIGINATE" are used to identify different groupings of nodes. Table 1 shows an example of a routing file.

TABLE 1

| (host/<br>domain) | (next hop) | |
|---|---|---|
| a.b.c.d | 1.2.3.4 | Forward host "a.b.c.d" to IP address "1.2.3.4". |
| b.c.d | hostname | Forward all requests within domain "b.c.d" to hostname. |
| !XYZNET | hostname | Forward all XYZNET connections to "hostname". |
| !LOCAL | x.y | Specifies the current domain as "x.y". |
| * | hostname | Specifies a default route. |

Access control is maintained to prevent Application layer bridge 22 from becoming a "super node" with unrestricted access to every node within every network. In the preferred embodiment an access control file "/etc/access" contains entries which control access between source and destination machines. The file is searched sequentially for an entry that matches both the originating host and the destination host. Once a match is found access for a connection is either permitted or denied. Accordingly the most restrictive entries are placed first in the file.

Table 2 shows an example of an access control file. Each entry contains up to eight fields, each field separated by blank spaces. The eight fields represent: an identifier keyword, a sequence number, a permission code, an originating code, an originating mask, a destination code, a destination mask and an application code. The identifier keyword and sequence number are used to ensure file integrity. The permission code is a code such as "permit" which allows the designated connection, "deny" which denies the connection, "permit-user" and "deny-user" which permit or deny a connection for a specific user of a node. The originating and destination codes identify the computer systems which initiate and receive the requests respectively. The code mask is a numeric code which is combined with a numeric IP address by a logical AND. The resultant address is compared to the address of either the origination or destination system systems. The application code designates specific applications for which connections for which communications are to be allowed or denied. Those skilled in the art can readily understand that many other well-known security mechanisms can be included within this file to be enforced by Application layer bridge 22.

TABLE 2

```
#Let all originating hosts have FTP access to external
#machines.
access-list 1 permit !ORIGINATE 0.0.0.0 !EXTERNAL ftp

#Let all originating hosts have Telnet access to external
#machines.
access-list 2 permit !ORIGINATE 0.0.0.0 !EXTERNAL telnet

#Let all hosts have FTP source access to their originating
#host/network.
access-list 3 permit 0.0.0.0 255.255.255.255 !ORIGINATE
0.0.0.255 ftp.src

#Let all hosts have FTP destination access to their
#originating host/network.
access-list 4 permit 0.0.0.0 255.255.255.255 !ORIGINATE
```

TABLE 2-continued

```
0.0.0.255 ftp.dst

#Give network 123.4.5.XXX unrestricted access to host
#111.222.333.444
access-list 5 permit 123.4.5.0 0.0.0.255 111.222.333.444
0.0.0.0

#Permit host "host.somewhere.com" unrestricted access to
#domain "domain.com" while denying everyone else access.
access-list 6 permit host.somewhere.com domain.com
access-list 9 deny 0.0.0.0 255.255.255.255 domain.com

#deny user "badguy" all access from any network node
access-list 10 deny-user badguy
```

A common problem encountered when establishing links between two computer networks is that of network address conflicts. For communication within a computer network, each computer system must have a unique address which the network software uses to direct information to that computer system rather than some other computer system. If two computer systems on the same network share the same network address then a conflict exists. For example, local computer system 11 has a first network address of "John's PC" which is unique within trusted computer network 16. Remote computer system 14 also has a second network address of "John's PC" which is unique within untrusted computer network 17. However, the first network address and the second network address are in conflict with one another when trusted computer network 16 is joined to untrusted computer network 17. An alternative embodiment in accordance with the present invention allows Application layer bridge 22 to resolve this conflict by hiding the network address of local computer system 11 and substituting a desired "external" address. A conflict caused by two computer systems which share the same IP address is also be resolved in this way. This embodiment also allows extra security in that the actual identity of local computer system 11 is thus unknown to users connected to untrusted computer network 17.

Figure 4:
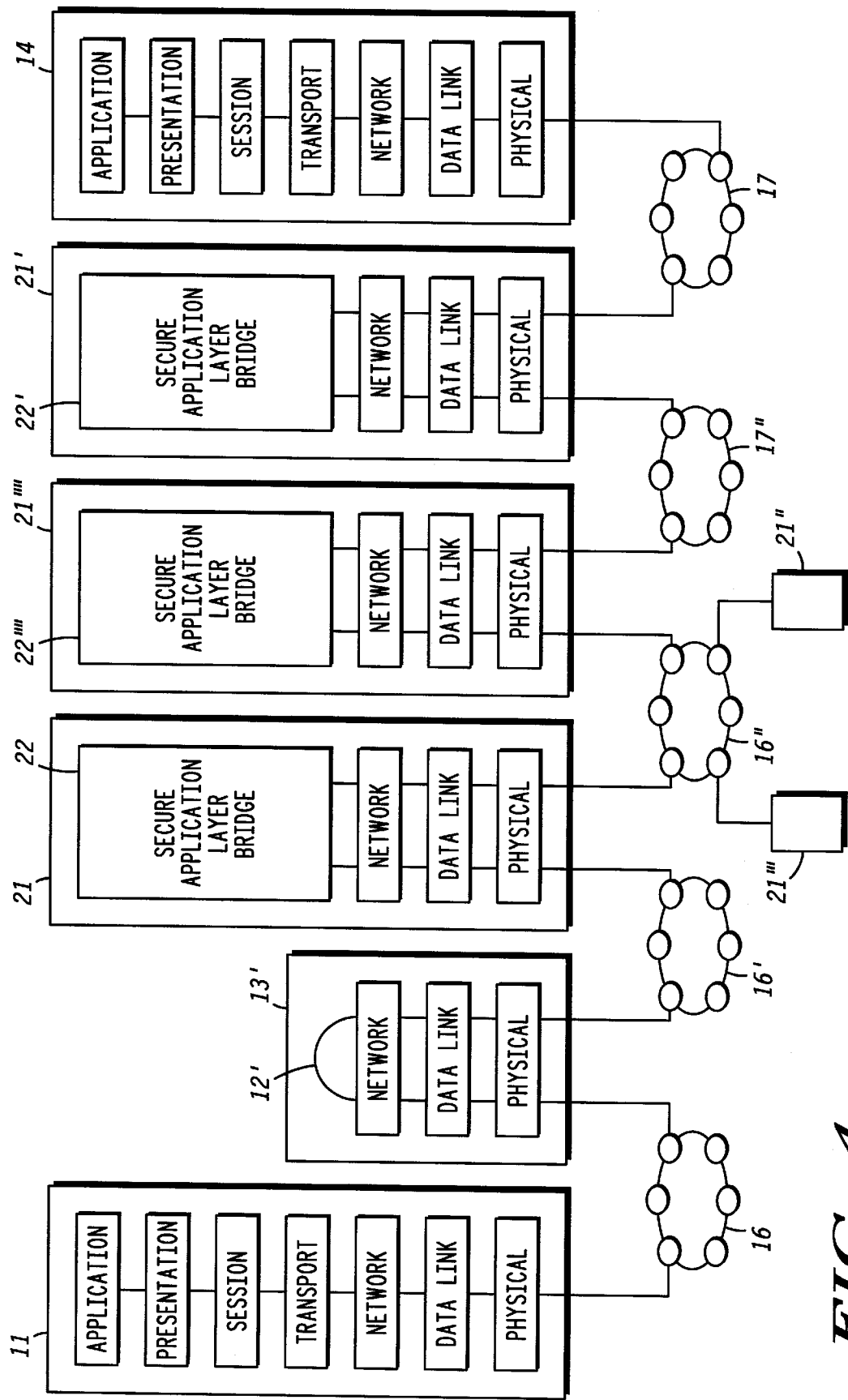
FIG. 4 shows a diagram of a local computer system connected to a remote computer system using intermediate network links as an alternative preferred embodiment in accordance with the present invention.

FIG. 4 shows a diagram of local computer system 11 connected to remote computer system 14 by a plurality of secure application layer bridges 22, 22' and 22"" while using an intermediate network bridge 13' as an alternative preferred embodiment in accordance with the present invention. FIG. 4 shows an example of a more complex linking of computer networks in which trusted network 16, trusted network 16' and 16" together with untrusted networks 17, and 17" are linked to provide communication between local computer system 11 and remote computer system 14. In this embodiment local computer system 11 makes a connection through network routing link 12' to secure Application bridge 22. Secure application layer bridge, after validating the request, establishes a link through Application layer bridge 22" to Application layer bridge 22'. Application layer bridge 22' establishes a connection through untrusted network 17 to remote computer system 14. Once these links are established local computer system 11 may exchange information with remote computer system 14 as desired.

In this example, trusted network 16 is further isolated from untrusted networks 17 and 17' by multiple secure hosts 21 and 21"". This allows trusted network 16 a measure of extra security by subdividing the trusted network and restricting access even within the trusted network to predetermined sub-networks. Since secure hosts 21, 21"", and 21' operate independently of the user and any software running on local computer system 11, any desired number of secure host 21 can be used in a communication path.

By now it should be clear that the present invention provides a network-to-network bridge which allows a private network to be connected to a public network such as the Internet while still controlling access to the private network. Application layer bridge 22 allows only authorized connections between the two networks while at the same time minimizing the administrative overhead and user inconvenience required to operate the bridge. The bridge operates without requiring interaction from the final user of local computer system 11. Application layer bridge 22 allows multiple levels of access for different users allowing some users access to only one or two systems within the private network, yet allowing free access to any machine on either the private network or the public network for other users. Apart from Application layer bridge 22, no special software is required for communication either within the private network or between the private network and the external public network. Application layer bridge 22 is flexible enough to allow trusted network 16 to connect to many untrusted networks besides untrusted network 17. Application layer bridge 22 contains routing information which transparently forwards information from local computer system 11 to its required destination without requiring user interaction. Application layer bridge 22 and 22' form a double firewall system, so if for some reason Application layer bridge 22' is compromised, the second Application layer bridge 22 will prevent compromise of trusted network 16.

We claim:

1. A composite computer network, comprising:

a trusted computer network having internal secure administrative control and access for users connected to said trusted computer network;

an untrusted computer network having internal unsecure administrative control and access for users connected to said untrusted computer network; and a plurality of firewall systems for providing controlled access between said trusted computer network and said untrusted computer network where a first firewall system is connected to said trusted computer network and a second firewall system is connected to said untrusted computer network, said plurality of firewall systems each including a secure application layer bridge which establishes a transparent connection across the plurality of firewall systems to automatically validate communication between said untrusted computer network and said trusted computer network once validation with one firewall system is accomplished.

2. A method for network communication, comprising the steps of:

providing a first trusted computer network having internal secure administrative control and access for users connected to the first trusted computer network;

providing an untrusted computer network having internal unsecure administrative control and access for users connected to the untrusted computer network;

controlling access between the first trusted computer network and the untrusted computer network with a plurality of firewall systems where a first firewall system is connected to the first trusted computer network and a second firewall system is connected to the untrusted computer network and the first firewall system is connected to the second firewall system through a second trusted computer network; and establishing a transparent connection across the plurality of firewall systems with a secure application layer bridge within each firewall system that automatically validates communication between the untrusted computer network and the first trusted computer network once validation with one firewall system is accomplished.

3. A composite computer network, comprising:

a first trusted computer network having internal secure administrative control and access for users connected to said first trusted computer network;

an untrusted computer network having internal unsecure administrative control and access for users connected to said untrusted computer network;

a first firewall system coupled to said first trusted computer network and including a first secure application layer bridge;

a second firewall system coupled to said untrusted computer network and including a second secure application layer bridge; and a second trusted computer network coupled to said first and second firewall systems to provide a communication link between said first trusted computer system and said untrusted computer system through said first and second firewall systems, said communication link being automatically validated through said first secure application layer bridge once validation with said second secure application layer bridge is accomplished.

* * * * *